Sept. 20, 1938.  J. J. McCABE  2,130,757
CLUTCH MECHANISM
Filed March 9, 1936  2 Sheets-Sheet 1
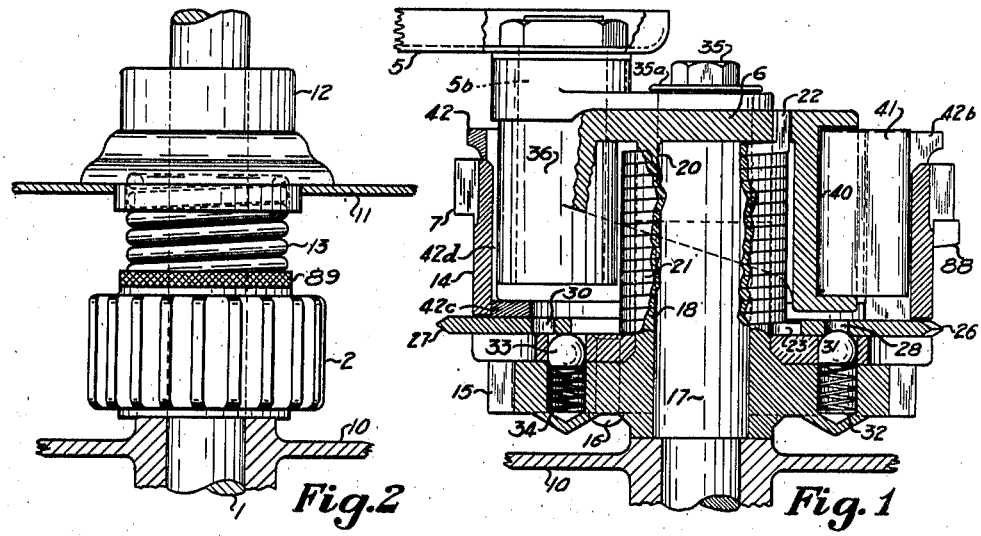
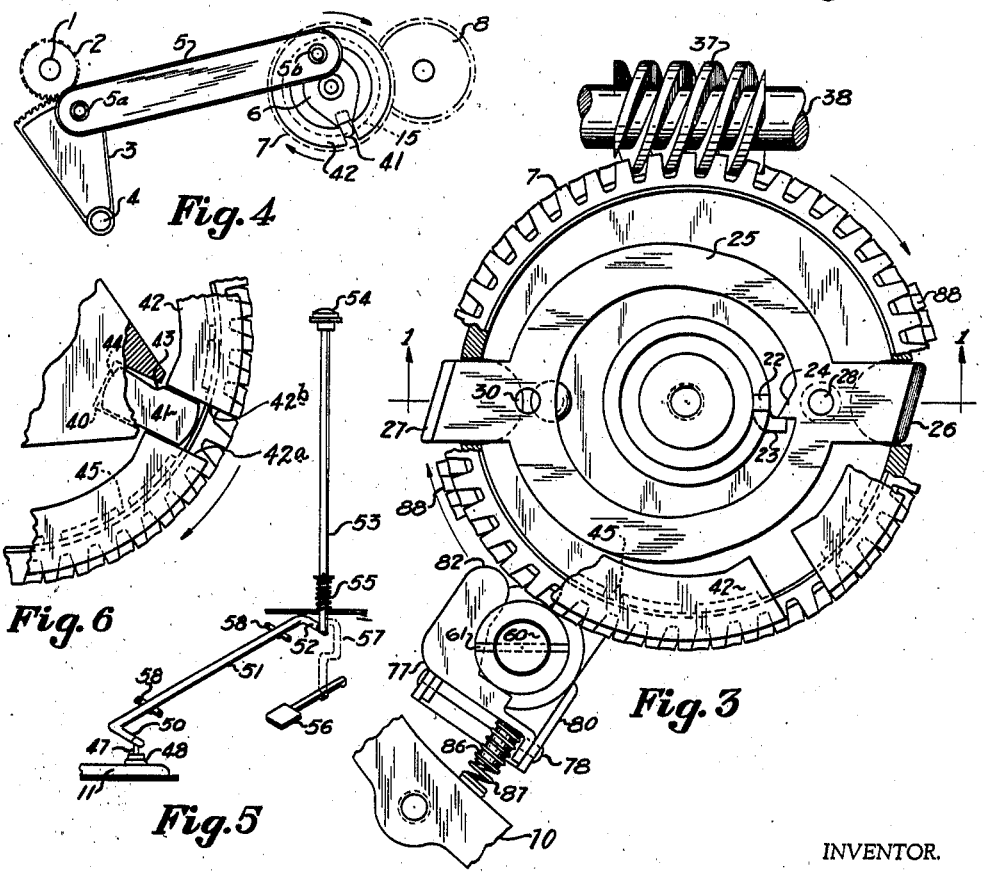
INVENTOR.
JOHN J. McCABE
BY Edmund J. Te Pas
his ATTORNEY

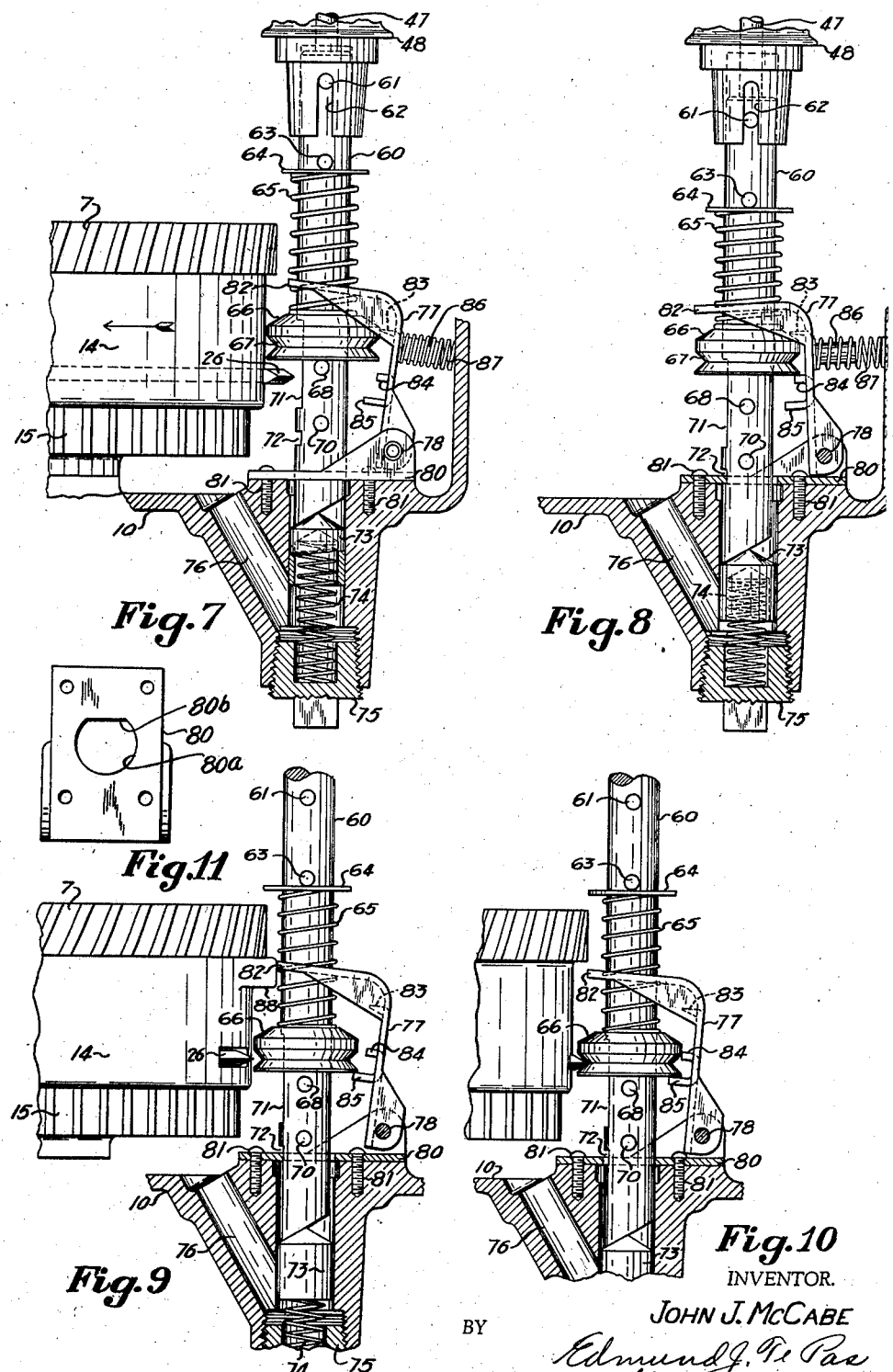

Patented Sept. 20, 1938

2,130,757

UNITED STATES PATENT OFFICE 2,130,757

CLUTCH MECHANISM

John J. McCabe, Euclid, Ohio, assignor to The Apex Electrical Manufacturing Company, Cleveland, Ohio, a corporation of Ohio Application March 9, 1936, Serial No. 67,830

10 Claims. (Cl. 192—48)

This invention relates to clutch devices for power-actuated mechanisms and it has for its object the provision of a clutch and an associated control arranged so that the clutch may be manipulated by the exertion of a minimum of force on the part of the operator; such clutch and its control being provided for connecting and disconnecting the working parts of a power driven mechanism with the power driving means of such mechanism.

Stated in general terms, the embodiment of the invention which is described herein for illustrating one mode of practicing the invention, comprises a spring clutch formed from a coiled flat-sided spring which is adapted to expand out of driving relation with respect to the driving and driven parts of the clutch to operably disconnect them from each other. Operable control means are provided for positively winding the spring to connect the driving and driven clutch elements, such control means being also adapted for movement to a position to permit the spring to unwrap itself from around the driving and driven clutch parts to disconnect them from each other.

These and other objects of the invention will become more apparent and better understood after consideration has been given to the following detailed description of the invention taken in connection with the drawings which show, merely by way of illustration, structure adapted for carrying out the objects of the invention.

In the drawings, Figure 1 is a sectional view taken on line 1—1, Figure 3 of a clutch illustrative of the invention; Figure 2 is a side elevational view, partly in section, of the oscillatably driven gear of the mechanism with which the clutch illustrated in Figure 1 is associated; Figure 3 is a plan view of the worm reduction drive and the clutch which is associated with such drive with certain of the upper parts broken away to show the structure therebelow; Figure 4 is a plan view of reduced size illustrating one form of gearing which the present invention is adapted to control; Figure 5 is a detail diagrammatical view of the manually operable controller for the clutch shown in Figures 1 and 3; Figure 6 is a plan view of a portion of the structure shown in Figure 3, illustrating one of the details of the clutch; Figures 7, 8, 9 and 10 are detail views showing the control elements of the clutch in the different positions which they occupy when they are moved to engage and disengage the clutch; and Figure 11 is a plan view of one of the elements of the clutch controller.

The driving mechanism of a gyratory type washing machine is illustrated in Figure 4 for the purpose of showing one form of mechanism in which the clutch and the associated clutch control disclosed herein may be used to advantage. Referring to this view of the drawings, the numeral 1 indicates an agitator shaft to which is secured a pinion 2 adapted to be driven by a gear segment 3 which is mounted for oscillation on a shaft 4. A pitman 5 having bearing pins 5ª and 5ᵇ, connects the gear segment 3 to the driven element 6 of a clutch device. This device is associated with a worm reduction gear 7 which is adapted to continuously drive a wringer driving gear 8.

The aforesaid structure is adapted to be housed within a gear case comprising a base or body part 10 and a cover plate 11. The agitator shaft 1 is provided with suitable bearing means 12 carried by the cover 11. A coil spring 13 is provided for maintaining a friction disk 89 in contact with one end of the agitator shaft pinion 2.

The worm reduction gear 7 is formed on the top rim of a cup-shaped member 14. A gear 15 is secured beneath the cup-shaped member 14 by any suitable means, such as, rivets 16. The cup-shaped member 14 and the associated gears 7 and 15 are mounted for rotation on a shaft 17 carried by the base or body part 10 of the gear case. The gear 15 is provided with a sleeve part 18 which extends upwardly inside the cup-shaped member 14. The inner surface of the sleeve part 18 of the gear 15 forms a bearing for receiving the shaft 17 and the outer surface of the sleeve part 18 forms the driving face of one element of a clutch.

The driven element 6 of the clutch is in the form of a crank arm having a depending sleeve part 20 which is also journaled on the shaft 17. The outer surface of the sleeve part 20 constitutes in effect a continuation of the outer surface of the sleeve part 18 of the gear 15. A coil spring 21 which may be formed from wire which is rectangular in cross-section, has one end 22 projecting through a hole in the driven clutch element 6 and is thus fixed at this end with respect to such clutch element. The other end of the clutch spring is outwardly turned at 23 to engage with the offset part 24 of a controller 25 for the clutch spring.

At its opposite sides, the controller 25 is provided with inclined cam faces 26 and 27 which both incline in the same direction. The controller 25 is also provided with an aperture 28 adjacent to the cam face 26 and another aperture 30 adjacent to the cam face 27. The aperture 28 is adapted for engagement with a ball or sphere 31 which is urged in an upward direction by a spring 32 carried in an aperture formed in the gear 15, and the cup-shaped member 14. A second ball or sphere 33 is adapted to cooperate with the aperture 30 and this ball is mounted in the gear 15 and the base of the cup-shaped member in much the same manner as for the ball 31 and it is urged in an upward direction by means of a spring 34.

The driven element 6 of the clutch is held against axial displacement on the shaft 17 by means of a cap screw 35 and a cooperating washer 35ª. The driven clutch element 6 is provided with a bearing sleeve 36 for receiving the pin or stub shaft 5ᵇ which is fixed to one end of the pitman 5. The worm gear 7 and the cup-shaped member 14 upon which this worm gear is formed, are driven by means of a shaft 38 upon which is carried a worm 37 which meshes with the worm gear 7.

At the side of the driven clutch element 6, opposite to the bearing sleeve 36, there is provided a rectangular slot or cavity 40 for receiving a portion of a key 41. The other portion of the key 41 is received between the adjacent ends 42ª and 42ᵇ of an expansible sleeve 42 which freely yet closely fits within the interior of the cup-shaped member 14.

The side of the key 41 which is received in the recess 40, is provided with a rounded surface 44 and the surface of the side of the key opposite to the side 44 is rounded off in a similar manner. One side of the key 41 is notched or grooved at 43 for the purpose of permitting slight pivotal or rocking movement of the key in its recess 40 for the purpose of expanding the sleeve 42 and thus providing an additional driving connection between the clutch element 6 and the cup-shaped member 14. The sleeve 42 is provided with an inwardly extending flange 42ᶜ at its bottom and it also has vertically arranged ribs 45 which frictionally engage with the inner surface of the cup-shaped member 14 when the sleeve is expanded. A portion of the sleeve 42 is cut away at 42ᵈ for accommodation of the sleeve 36 of the element 6.

The operation of the clutch is as follows: When the stop 24 of the clutch controller is disengaged with respect to the end 23 of the clutch spring 21, as for example when it is shifted to the right of the position shown in Figure 3 of the drawings, the gear 7, the cup-shaped member 14 and the associated sleeve 18 may be continuously rotated relatively to the driven clutch element 6 and the structure operatively connected to such element because of the inherent tendency of the spring 21 to expand out of driving relation with the sleeves 18 and 20. When the stop 24 of the clutch controller 25 is moved into position to engage the end 23 of the clutch spring as shown in Figure 3, the spring 21 will be wrapped about the sleeve 18, thus effecting the engagement of the clutch parts formed by the spring and the aligned sleeve portions 18 and 20.

This operation of the clutch follows the well-known procedure for coil spring clutches of the type disclosed and the clutch acts in a more positive and quicker manner by reason of the slight resistance offered by the friction element 89 which engages with the top of the pinion 2, particularly when the machine is started under conditions where the driven mechanism would impose no load upon the clutch.

The balls or spheres 31 and 33 cooperate with the apertures 28 and 30 respectively to releasably hold the clutch controller 25 in one or the other of its adjusted positions. The manual actuator which is provided for the control of the clutch is illustrated in detail in Figures 5 and 7 to 10 inclusive. In these views, Figure 7 shows the clutch in either an engaged or a disengaged position; Figure 8 shows the initial position assumed by the clutch actuator when it is desired to operate the clutch; and Figures 8, 9 and 10 show, in the order named, the different positions which the clutch actuator automatically assumes after it has once been moved to the position shown in Figure 8. The operation of the clutch actuator is exactly the same for effecting both the engaging and disengaging operations.

Referring now to Figure 5, the top of the gear case is provided with a bearing 48 for slidably receiving a pin 47 which projects from the gear case at this point. The pin 47 is adapted to be engaged by the arm 50 of a crank member 51 which has a second arm 52 adapted for engagement with a control rod 53. The control rod 53 is provided with an operating knob or button 54 at its upper end. A spring 55 is provided to urge the rod 53 upwardly in a direction away from the crank arm 52. A connecting link 57 is attached to the lower end of the rod 53 so that the rod and the clutch which it controls may also be operated by means of a foot pedal 56.

The pedal 56 and the knob 54 provide optional clutch controls for the convenience of the operator of the machine. It is contemplated to have the control knob 54 located adjacent to the top of the machine and the foot pedal 56 would be located adjacent to the bottom of the machine just above the surface upon which the machine rests. The crank member 51 is carried in suitable bearing brackets 58 which may be secured to the structure (not shown) of the machine with which the mechanism shown herein is intended to be used.

Referring now to Figures 7 to 10, the clutch operating pin 47 is fixed to the upper end of a longitudinally slidable shaft 60, the upper end of which is also received in the bearing 48. The bearing 48 is slotted at its sides for receiving a pin 61 which projects through the shaft 60. A second pin 63 is carried by the shaft 60 for the purpose of holding a washer 64 against the tension of a coil spring 65. The other end of the spring 65 abuts against a ring 66 slidably carried on the shaft 60.

The top of the ring 66 is cut on an angle with respect to the horizontal and at its lower portion the ring is formed with an annular groove 67. The ring 66 normally rests upon a pin 68 carried by the shaft 60 and is resiliently held against this pin by means of the spring 65. Another pin 70 is carried by the shaft 60 just below the pin 68 to provide a stop for limiting the downward movement of the shaft 60.

A portion of the side of the shaft is removed at 71 to permit ample room for the clearance of the clutch controller cam faces 26 and 27. This same side of the shaft is notched at 72 and its lowermost end is cut on an angle corresponding to the angle of the conical top of a plug or plunger 73 which is slidably received in a suitable guideway formed in the base 10 of the gear case.

A spring 74 is provided to urge the plunger 73 against the end of the shaft 60. The spring 74 is held in place in the gear case by means of a removable plug 75. The gear case is provided with a passageway 76 for the purpose of conveying lubricant to the operating parts of the clutch control.

A member 77 which is pivoted at 78 to a bracket 80, is provided for controlling the automatic operation of the ring 66. The bracket 80 is secured to the base 10 of the gear case by any suitable means, such as, screws 81. The base of the bracket 80 is provided with an aperture 80a for receiving the shaft 60. This aperture is formed with a straight side 80b which cooperates with the notch 72 of the shaft to hold the shaft in its lower position at certain times during its operation.

The member 77 is in the form of an L-shaped arm having an end 82 closely adjacent to the cup-shaped member 14 of the clutch. Suitable offset parts in the form of lugs or ledges 83, 84 and 85 are provided, one below the other, on the upright portion of the member 77 for cooperation with the ring 66. A pin 86 is fastened to one side of the member 77 for the purpose of holding a spring 87 in place on this member. The spring 87 is provided to urge the member 77 to the left about its pivot 78 as viewed in Figures 7 to 10. The cup-shaped member 14 is provided with offset cams 88 which are adapted to engage at times with the end 82 of the member 77.

In the operation of the device when either the knob 54 or the pedal 56 is depressed, the shaft 60 will be moved downwardly from the position shown in Figure 7 to the position shown in Figure 8. The aperture in the gear case which receives the lower end of the shaft 60 being somewhat larger than the diameter of the shaft, will permit the shaft to move sideways a slight amount under influence of the force exerted by the plunger 73 on the inclined faces of the lower end of the shaft, and in this manner the notched part 72 of the shaft is moved into engagement with the straight side of the hole which is formed on the bracket 80 for receiving the shaft.

The engagement of the shaft 60 at this point with the bracket 80 will temporarily hold the shaft in the position shown in Figure 8. When the aforesaid operations were taking place, the ring 66 was moved out of contact with the offset part 83 of the member 77 and this member was shifted to the position shown in Figure 8 by the action of the spring 87, and at the same time further downward movement of the ring was stopped by the offset part 84 of the member 77 upon which the ring is now resting.

One or the other of the cams 88 of the continuously rotating cup-shaped member 14 will now engage the end 82 of the member 77, moving this member to the position shown in Figure 9, whereupon the ring 66 drops into engagement with the offset part 85 of the member 77. The groove of this ring is then engaged by one or the other of the cams 26 or 27 of the clutch control member 25, whichever one happens to be in its outermost position, and upon engagement with the ring, the member 25 is moved inwardly to one of its limiting positions.

At the same time that the above operation takes place, the notch 72 of the shaft 60 is moved out of registry with the member 80 by contact of the ring with one or the other of the cams 26 or 27, whereupon the shaft is free to move to its initial position, as shown in Figure 7, under influence of the spring 74 and the device is in position to repeat the steps just described when the pin 41 is again depressed. By reason of this arrangement, the clutch is alternately engaged and disengaged when the foot pedal 56 or control knob 54 are pressed downwardly. The movement of the ring 66 from the position shown in Figure 8 to the position shown in Figures 9 and 10 and its subsequent movement back to the position shown in Figure 7, automatically occur in timed sequence in accordance with the speed of the driven clutch parts which contact with the member 77 and the ring 66 to effect the stated movements of the ring 66. The force required to effect the actuation of the clutch is very slight indeed and the arrangement shown constitutes what is known as a "finger-tip control."

The ease with which this device may be operated is due largely to the use of a one-way clutch which makes use of part of the energy of the driving device to effect the driving connection. When a clutch of this type is used in connection with a reciprocating part which has a tendency at one end of its stroke to overrun the driving mechanism, it is possible for the clutch to become disengaged temporarily, and with a mechanism such as shown in Figure 4, this would cause knocking and jerky operation of the oscillatable shaft.

This difficulty is overcome in the present construction by means of the provision of a second clutch which is formed in part by the expansible sleeve 42. The manner in which this works is as follows: When the pitman 5 tends to drive the driven clutch element 6, it will cause the member 41 to be rocked in the recess 40 and as this takes place, the rocking of the member 41 will expand the sleeve 42, causing it to tightly grip the cup-shaped member 14 and thus maintain the driving connection between the gears 2 and 7.

The sleeve 42 is closely yet loosely fitted within the cup 14 so that a very slight movement of the member 41 will effect the engagement between the cup and the sleeve. The necessary frictional drag between the sleeve 42 and the cup 14 is sufficient to retard the free movement of the sleeve sufficiently to permit the member 41 to expand it.

The foregoing description and the accompanying drawings to which it relates, describes what might be termed the preferred mode of practicing the invention. It is to be clearly understood, however, that the invention includes each and every novel feature or combination of novel features herein disclosed, subject only to the restrictions of the prior art, and that the invention may assume other forms and it is not to be limited to the particular and specific structure shown and described herein, and the right is reserved to add broader or more specific claims to any such feature or combination of features of the invention as may appear to be warranted upon learning more about the prior art, even though such broader or more specific claims may appear to involve a departure from the invention defined by the claims originally presented upon the filing of this application.

Having thus described my invention what I claim is:

1. A clutch assembly comprising, a driving clutch element and a driven clutch element, a coil spring secured to one of said clutch elements and adapted to frictionally engage the other clutch element, means for effecting the engagement and disengagement of said spring with respect to said last named clutch element during the operation of said driving clutch element, and means comprising an annular, expansible friction member automatically connecting said driven element to said driving element when said driven element tends to drive the driving element, said last-named means including an element operated by said driven element for expanding said expansible friction element under the conditions specified.

2. A clutch assembly comprising, a cup-shaped clutch member with an upstanding central portion inside the cup defined by such member and a cooperating clutch member adapted for reception in said cup-shaped member and having separate, normally disconnected portions contiguous to both the upstanding central portion and the sides of the cup-shaped member, and means effective during the operation of one of said clutch members for frictionally connecting and disconnecting the contiguous portions of said members to each other, direct frictional contact being provided between said cooperating clutch member and the sides of said cup-shaped clutch member.

3. A clutch assembly comprising, a cup-shaped clutch member with an upstanding central portion inside the cup defined by such member and a cooperating clutch member adapted for reception in said cup-shaped member and having separate portions contiguous to the upstanding portion and the sides of the cup-shaped member, means including a coil spring for frictionally connecting and disconnecting the contiguous central portions of said members to each other during the operation of one of said clutch members, and means for effecting direct frictional contact between said cooperating clutch member and the sides of said cup-shaped clutch member, such members being normally disconnected with respect to each other.

4. A clutch assembly comprising, driving and driven elements including a cup-shaped clutch member with an upstanding central portion inside the cup defined by such member and a cooperating clutch member adapted for reception in said cup-shaped member and having separate portions contiguous to the upstanding portion and the sides of the cup-shaped member, means including a radially expansible sleeve forming a part of said driven clutch element for frictionally connecting the outer contiguous portions of said members to each other when said driven element tends to drive said driving element, said sleeve being normally disconnected with respect to said first-named clutch member, and means for effecting the engagement and disengagement of said driven clutch element during the operation of the latter.

5. A clutch assembly comprising, driving and driven elements including a cup-shaped clutch member with an upstanding central portion inside the cup defined by such member and a cooperating clutch member adapted for reception in said cup-shaped member and having separate portions contiguous to the upstanding portion and the sides of the cup-shaped member, and means for frictionally connecting and disconnecting the contiguous portions of said members to each other during the operation of said driving clutch element, said means including a coil spring for connecting the upstanding central portion of the cup-shaped member to the portion of the cooperating clutch member contiguous thereto and a radially expansible sleeve for connecting the cooperating clutch member to the sides of the cup-shaped member when said driven element tends to drive said driving element, said sleeve being normally disconnected with respect to said first-named clutch member.

6. A continuously operable driver having a disconnectible driving connection with a driven device, and a controller for such driving connection comprising an element movable with said driver and a second element movable into the path of said first-named element and means for effecting the movement of said second element into the path of said first-named element, such movement being manually initiated and automatically completed in timed relation with respect to the movement of said first-named element.

7. A continuously operable driver having a disconnectible driving connection with a driven device, and a controller for such driving connection comprising an element movable with said driver and a second element movable into the path of said first-named element and means for effecting the movement of said second element into the path of said first-named element, such movement being manually initiated and automatically completed by said driver in timed relation with respect to the movement of said first-named element.

8. A continuously operable driver having a disconnectible driving connection with a driven device, and a controller for such driving connection comprising an element movable with said driver and a second element movable into the path of said first-named element and means for effecting the movement of said second element into the path of said first-named element, such movement being manually initiated and automatically completed in timed relation with respect to the movement of said first-named element, said second element being automatically returned to its initial position after contact with said first-named element.

9. A clutch comprising rotatable driving and driven elements, a control element rotatable with said driving element and projecting outwardly therefrom, an axially movable rod alongside of said driving element, a member for contacting said control element slidably mounted upon said rod, a member pivotally mounted alongside of said rod providing a series of detents which are engaged one after the other by said first-named member upon displacement of the rod for controlling the movement of the member in timed sequence; said pivotally mounted member having a part adapted to be contacted by said driving element for shifting such member to permit the first-named member to move into engagement with the next detent of the pivotally mounted member.

10. The combination with a continuously operable driver and a selectively operable driven device, of an easily operable disconnectible driving connection between said driver and device comprising a control element movable with said driver, an associated control element mounted at one side of said driver and movable into the path of said first named control element, means for the actuation of said second named control element comprising a manually tensioned spring by means of which such control element is moved into the path of said first named control element, and a second spring for returning said second named control element to its original position.

JOHN J. McCABE.